United States Patent [19]

Smith

[11] 4,008,466
[45] Feb. 15, 1977

[54] DEVICE FOR INDICATING ANGULAR POSITION AND DEPTH OF A TOWED VEHICLE

[76] Inventor: William V. Smith, 1617 Duke St., Memphis, Tenn. 38108

[22] Filed: Nov. 7, 1975

[21] Appl. No.: 629,966

[52] U.S. Cl. .......................... 340/282; 180/103 R; 340/52 R; 340/244 C
[51] Int. Cl.² .................... G08B 21/00; B60Q 9/00
[58] Field of Search ............ 340/282, 244 C, 52 R, 340/420; 180/103 R

[56] References Cited

UNITED STATES PATENTS

| | | | |
|---|---|---|---|
| 3,237,177 | 2/1966 | Sparks et al. | 340/282 |
| 3,431,779 | 3/1969 | Wilken et al. | 340/52 R |
| 3,694,804 | 9/1972 | Hill | 340/244 C |
| 3,821,699 | 6/1974 | Marus et al. | 340/244 C |

*Primary Examiner*—Glen R. Swann, III
*Attorney, Agent, or Firm*—Watson, Cole, Grindle & Watson

[57] ABSTRACT

An angular indicator indicates the relative angular relationship between a towed vehicle and a towing vehicle. A housing of the indicator is mounted on the towing vehicle. A movable arm has one end coupled to the towed vehicle and its other end coupled to the housing and is slidable along a slot provided within the housing. A variable slide resistor is arranged within the housing and is coupled to the end of the movable arm which is slidable along the housing. The variable resistor provides a resistance which varies in dependence upon the relative angular movement between the coupled towed vehicle and towing vehicle. An electrical measuring circuit has an input terminal which is electrically coupled to the resistance of the variable slide resistor and provides an output signal varying in dependence upon variations in the resistance of the variable slide resistor. A volt meter is coupled to receive the output signal from the electrical measuring circuit and provides an indication of the relative angular relationship between the coupled towing vehicle and towed vehicle. A water-sensing probe is mounted on the towed vehicle to short the input terminal of the electrical measuring circuit to the frame of the towed vehicle when the probe contacts water. This produces a maximum reading on the volt meter, indicating the towed vehicle is at the proper depth for launching a boat therefrom.

6 Claims, 4 Drawing Figures

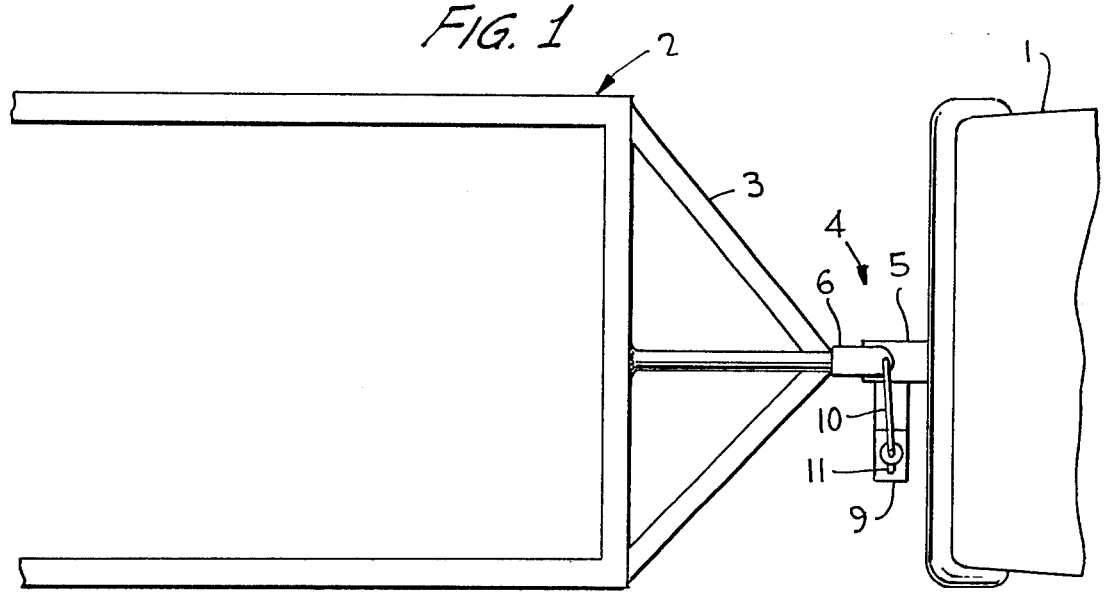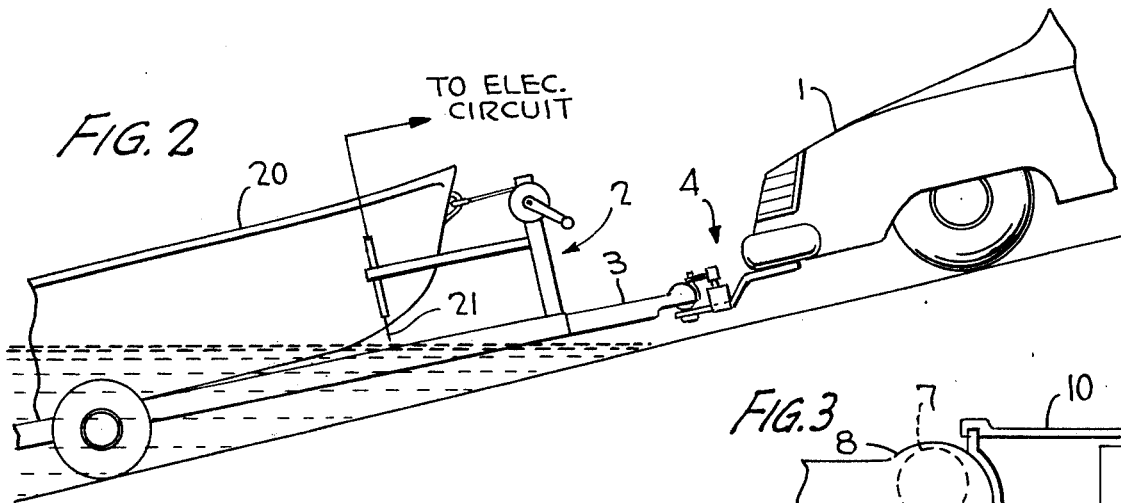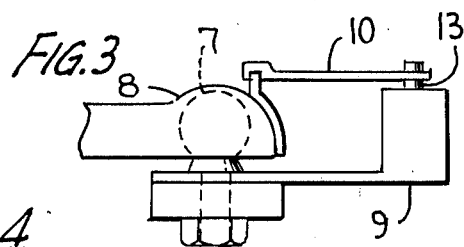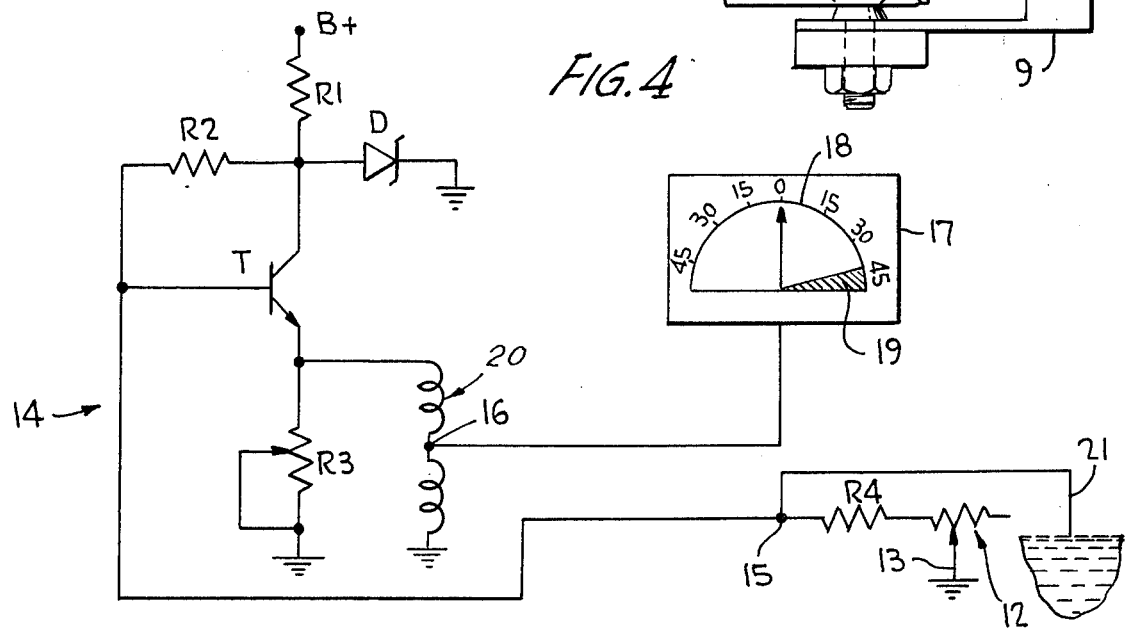

4,008,466

DEVICE FOR INDICATING ANGULAR POSITION AND DEPTH OF A TOWED VEHICLE

BACKGROUND OF THE INVENTION

The present invention relates to an indicating device for providing an indication of the relative angle between a coupled towed vehicle and towing vehicle.

When backing up with an automobile, or any other similar towing vehicle, having a coupled towed vehicle attached to the rear bumper, it is often a problem trying to keep the towed vehicle in alignment along the same longitudinal axis as the automobile. In order to assist in this procedure, it is desirable if the person within the automobile knows the exact relative angle between the towed vehicle and the automobile. For this purpose, it is desirable to provide some type of visual indicator which can be seen by the person in the automobile as he proceeds to back up.

Several devices have been developed within the prior art for accomplishing this basic objective. One type of device is a mechanically operated indicator which provides an indication of this angular relationship, which indication can be seen in the rear view mirror of the person driving the automobile. Such a device is illustrated in U.S. Pat. No. 2,736,885 issued to Thompson. There also have been developed in the past few years, several electrical indicating devices for the purpose of providing an indication of the relative angular relationship between the two vehicles. Such devices are illustrated in U.S. Pat. Nos. 3,605,088 and 3,833,928 issued to Savelli and Gavit el al., respectively.

When backing up a boat trailer, it also becomes desirable to have some type of indication as to when the trailer has reached a proper depth within the water for launching of the boat. Thus, the present invention is concerned with providing a water sensing indicator capable of providing such an indication.

While U.S. Pat. No. 3,585,582 issued to Dove illustrates an indicator which senses when a trailer has reached a certain depth in the water, this indicator is provided below the wheel hub assembly and is utilized for providing a warning signal before the hub assembly comes into contact with the water. Such an indicator, however, cannot be utilized on a trailer for launching a boat since almost the entire trailer must be submerged in the water for proper launching.

SUMMARY OF THE INVENTION

An object of the present invention is to provide an effective and inexpensive electrical indicating device for providing a visual indication of the exact angular relationship between a towing vehicle and a coupled towed vehicle.

Another object of the present invention is to provide a water sensor indicator which is capable of providing an indication as to when a towed vehicle has reached a proper position within a body of water for launching a boat from the vehicle with such indication being provided on the same visual indicator as that utilized for indicating the angular relationship between the towed vehicle and the towing vehicle.

In accordance with the present invention, an indicator is provided for indicating the relative angular relationship between a coupled towed vehicle and towing vehicle. This indicator includes a housing which is mounted on one of the vehicles. A movable arm has one end coupled to the housing and is slidable along a slot within the housing. The other end of the movable arm is coupled to the other vehicle. A variable slide resistor is arranged within the housing and is coupled to the end of the movable arm which is coupled to the housing. The variable slide resistor provides a resistance which varies in dependence upon the relative angular movement between the coupled towed vehicle and towing vehicle, which variable resistance is coupled to an input terminal of an electrical measuring circuit. The electrical measuring circuit in turn provides an output signal which varies in dependence upon variations in the resistance of the variable slide resistor. This output signal is then coupled to a volt meter which provides an indication of the relative angular relationship between the coupled towing vehicle and towed vehicle.

It is also possible in accordance with the present invention to provide a water sensing indicator for sensing when a certain portion of the towed vehicle comes into contact with water. This type of indicator is utilized when backing a towed vehicle into the water for launching a boat. The water sensing member is located at a selected location on the towed vehicle and upon contact with the water, the input terminal of the electrical measuring circuit is electrically coupled to the frame of the towed vehicle, thereby causing the electrical measuring circuit to provide a maximum output signal for causing a maximum indication on the volt meter.

BRIEF DESCRIPTION OF THE DRAWINGS

FIG. 1 is a plan view illustrating a portion of the towed vehicle coupled to the towing vehicle utilizing an indicator mechanism in accordance with the present invention.

FIG. 2 is a perspective side view of the coupled towed vehicle and towing vehicle illustrated in FIG. 1, with a boat being mounted on the towed vehicle.

FIG. 3 is a schematic view of a portion of the coupling mechanism and indicator mechanism utilized in accordance with the present invention.

FIG. 4 is a schematic circuit diagram of the indicator system of the present invention.

DESCRIPTION OF THE PREFERRED EMBODIMENT

As illustrated in FIG. 1, an automobile 1 is coupled to frame 3 of a trailer 2 by a coupling mechanism 4. Thus, automobile 1 serves as a towing vehicle for towing the trailer. Coupling mechanism 4 has a first coupling section 5 which is attached to the rear bumper of automobile 1 and a second coupling section 6 which is attached to frame 3 of the trailer. For interconnecting coupling sections 5 and 6, ball-and-socket coupling members 7 and 8, respectively, (see FIG. 3) are provided on the sections.

A movable arm 10 is eccentrically coupled to socket member 8 at one end and is coupled to a housing 9 via a coupling rod 13 at its other end. Movable arm 10 and rod 13 are slidable within a slot 11 which is provided in housing 9. It is this housing 9 which contains the electrical measuring circuit of the indicator device. Thus, as trailer 2 moves from one side to the other with respect to automobile 1 thus varying the relative angular relationship between the two vehicles, movable arm 10 will slide back and forth along slot 11.

Movable arm 10 in turn is coupled by rod 13 to a slide resistor 12, as shown in FIG. 4. Thus, the movement of arm 10 in turn varies the resistance of slide resistor 12. This resistance of slide resistor 12 is coupled to input terminal 15 of electrical measuring circuit 14.

Electrical measuring circuit 14 includes a transistor T which is biased by a 12-volt DC source, indicated by B+. This DC source is kept constant at the 12-volt level by resistor R1 zener diode D. Resistor R2 serves as a bias resistor for biasing the base of the transistor. A variable resistor R3 is coupled to the emitter of transistor T and is utilized in calibrating the system upon initial installation. A resistor R4 is provided in order to insure that there is a sufficient resistance provided to the input for allowing the water indicator to operate properly, which indicator will be further described later. A signal is provided across coil 20 by electrical measuring circuit 14. Terminal 16 then taps an output signal off of coil 20, which ouput signal in turn is fed to volt meter 17. Meter 17 has a visual indicating scale 18 which is calibrated in terms of angular measurement so as to be capable of indicating the relative angular relationship between trailer 2 and automobile 1. Electrical measuring circuit 14 thus provides a variable output signal to meter 17, which signal is dependent upon the variance in the resistance of slide resistor 12.

In connection with the same indicator device, it is also possible to incorporate a water sensing indicator for indicating when a boat trailer has reached a proper launching position within the water, such as shown in FIG. 2. Thus, a water sensing member 21 is positioned at a selected location and height with respect to the trailer so that as the automobile backs up trailer 2 and boat 20, an indication is transmitted to volt meter 17 when water sensing member 21 comes into contact with the water. Water sensing member 21 can be formed merely by an electrical conductor which has been stripped of its insulation and which is connected to input terminal 15 of electrical measuring circuit 14. Thus, when water sensing member 21 comes into contact with the water, terminal 15 is effectively coupled through sensing member 21 to frame 3 of trailer 2. When this occurs the needle of the meter will be deflected into area 19 of scale 18 thereby providing an indication that a proper launching position for the boat has been reached.

It is noted that the above description and the accompanying drawings are provided merely to present an exemplary embodiment of the present invention and that additional modifications of this embodiment are possible within the scope of this invention without deviating from the spirit thereof.

I claim:

1. An indicator for indicating the relative angular relationship between a towed vehicle and a towing vehicle to which the towed vehicle is coupled, the indicator comprising:
    a housing to be mounted on one of the vehicles and said housing having a laterally extending slot therein;
    a movable arm having one end to be coupled to the other of the vehicles, said movable arm having its other end coupled to said housing mounted on one of the vehicles and being slidable along said slot;
    a variable slide resistor arranged within said housing and being coupled to said other end of said movable arm, said variable slide resistor providing a resistance varying in dependence upon the relative angular movement between the coupled towed vehicle and towing vehicle;
    electrical measuring means having an input terminal electrically coupled to said variable slide resistor and providing an output signal varying in dependence upon variations in the resistance of said variable slide resistor;
    a volt meter coupled to receive the output signal from said electrical measuring means and providing an indication of the relative angular relationship between the coupled towed vehicle and towing vehicle and,
    a water sensor indicator having a water sensing member to be mounted on a towed vehicle and serving to effectively couple said input terminal of said electrical measuring means to the towed vehicle's frame when said water sensing member comes into contact with water for causing said electrical measuring means to provide a maximum output signal thereby causing a maximum indication on said volt meter.

2. An indicator as defined in claim 1 wherein said housing is to be mounted on the towing vehicle and said one end of said movable arm is to be coupled to the towed vehicle.

3. An indicator as defined in claim 2 wherein said one end of said movable arm is to be eccentrically mounted on a coupling socket of the towed vehicle such coupling socket being of the type to be utilized in a ball-and-socket coupling joint.

4. An indicator as defined in claim 1 wherein said water sensing member is formed by an electrical conductor having an end portion free of any insulation and being arranged in a selected location on a towed vehicle for indicating when such vehicle is in a proper position for launching a boat from a towed vehicle on which it is mounted.

5. An indicator as defined in claim 1 wherein said volt meter includes a visual indicator, said visual indicator being calibrated so as to provide a visual indication of the relative angular relationship between the towed vehicle and the towing vehicle.

6. A towed vehicle system including means for coupling the towed vehicle to a towing vehicle, the system comprising:
    a frame structure for said towed vehicle;
    said coupling means including a first coupling member adapted to be coupled to a towing vehicle and having a ball at one end and a second coupling member including a socket member and being connected to said frame structure, said socket member being adapted to be coupled to said ball member for connecting said towed vehicle to a towing vehicle;
    electrical indicating means for indicating the relative angular relationship between said towed vehicle and a towing vehicle to which said towed vehicle is coupled, said indicating means including a housing mounted on said first coupling member, a movable arm having one end coupled to said socket member of said second coupling member and its other end slidably coupled to said housing mounted on said first coupling member so as to be coupled to a towing vehicle, a variable slide resistor coupled to said other end of said movable arm and providing a resistance varying in dependence upon the relative angular movement between said towed vehicle and a corresponding towing vehicle, electrical measuring means having an input terminal electrically coupled to said variable slide resistor and providing an output signal varying in dependence upon variations in the resistance of said variable slide resistor, and a volt meter coupled to receive the output signal of said electrical measuring means and providing an indication of the relative angular relationship between said towed vehicle and a corresponding towing vehicle; and, a water sensor indicator including a water sensing member mounted on said towed vehicle and serving to effectively couple said input terminal of said electrical measuring means to said frame when said water sensing member comes into contact with water for causing said electrical measuring means to provide a maximum output signal thereby causing a maximum indication on said volt meter.

* * * * *